(12) United States Patent
Arnold et al.

(10) Patent No.: US 7,695,566 B2
(45) Date of Patent: Apr. 13, 2010

(54) EXTRACTION OF CONSTITUENTS FROM SUGAR BEET CHIPS

(75) Inventors: Jochen Arnold, Obrigheim (DE); Stefan Frenzel, Weinheim (DE); Thomas Michelberger, Grünstadt (DE); Timo Scheuer, Worms (DE)

(73) Assignee: Sudzucker Aktiengesellschaft, Mannheim/Ochsenfurt, Mannheim (DE)

( * ) Notice: Subject to any disclaimer, the term of this patent is extended or adjusted under 35 U.S.C. 154(b) by 609 days.

(21) Appl. No.: 11/628,345

(22) PCT Filed: May 3, 2005

(86) PCT No.: PCT/EP2005/004769

§ 371 (c)(1),
(2), (4) Date: Dec. 1, 2006

(87) PCT Pub. No.: WO2005/123967

PCT Pub. Date: Dec. 29, 2005

(65) Prior Publication Data

US 2008/0060637 A1    Mar. 13, 2008

(30) Foreign Application Priority Data

Jun. 16, 2004   (DE) .................. 10 2004 028 782

(51) Int. Cl.
*C13D 1/12* (2006.01)
(52) U.S. Cl. .......................................... 127/43; 127/44
(58) Field of Classification Search .................. 127/41, 127/43, 44
See application file for complete search history.

(56) References Cited

U.S. PATENT DOCUMENTS

| | | | |
|---|---|---|---|
| 4,723,483 A * | 2/1988 | Papchenko et al. | 99/451 |
| 5,031,521 A * | 7/1991 | Grishko et al. | 99/451 |
| 2005/0199134 A1* | 9/2005 | Schultheiss et al. | 99/451 |
| 2006/0106210 A1* | 5/2006 | Frenzel et al. | 536/124 |
| 2008/0214804 A1* | 9/2008 | Arnold et al. | 536/128 |

FOREIGN PATENT DOCUMENTS

| | | |
|---|---|---|
| IT | 1272819 | 6/1997 |
| WO | WO-96/09412 | 3/1996 |
| WO | 99/64634 A | 12/1999 |
| WO | WO-01/80946 | 11/2001 |

OTHER PUBLICATIONS

Eshtiaghi et al, "High electric field pulse pretreatment: potential for sugar beet processing" Journal of Food Engineering 52 (2002) 265-272.*
Schultheiss et al, "Industrial-scale electroporation fo plant material using high repititian rate marx generators", IEEE Explore 0-7803-7120-8/02 (2002) IEEE.*
Jianbo et al, The effect of electrical conductivity on pore resistance and electroporation:, Americal Physical Society, 61st annual meeting Nov. 23-25, 2008.*
Ngadi et al, "Engineering Aspects of Pulsed Electroplasmolysis of Vegetable Tissues", Agricultural Engineering International, vol. V, Feb. 2003.*
Hoffmann, J.: Wie kommt der Zucker aus der Rube:, IDW, Dec. 13, 2002, XP002276912, abstract.
Database Compendex [Online] Engineering Information, Inc., New York, NY, US; 2002, XP002337397, Database accession No. E2002116885133 abstract & Eshtiaghi M N et al: "High electric field pulse pretreatment: Potential for sugar beet processing" J Food Eng; Journal of Food Engineering May 2002, vol. 52, No. 3, May 2002, pp. 265-272.

* cited by examiner

*Primary Examiner*—David M Brunsman
(74) *Attorney, Agent, or Firm*—Harness, Dickey & Pierce, P.L.C.

(57) ABSTRACT

The present invention relates to a method and an installation for improving isolation and extraction of constituents from sugar beets (*Beta vulgaris*).

20 Claims, 1 Drawing Sheet

EXTRACTION OF CONSTITUENTS FROM SUGAR BEET CHIPS

Figure 1:
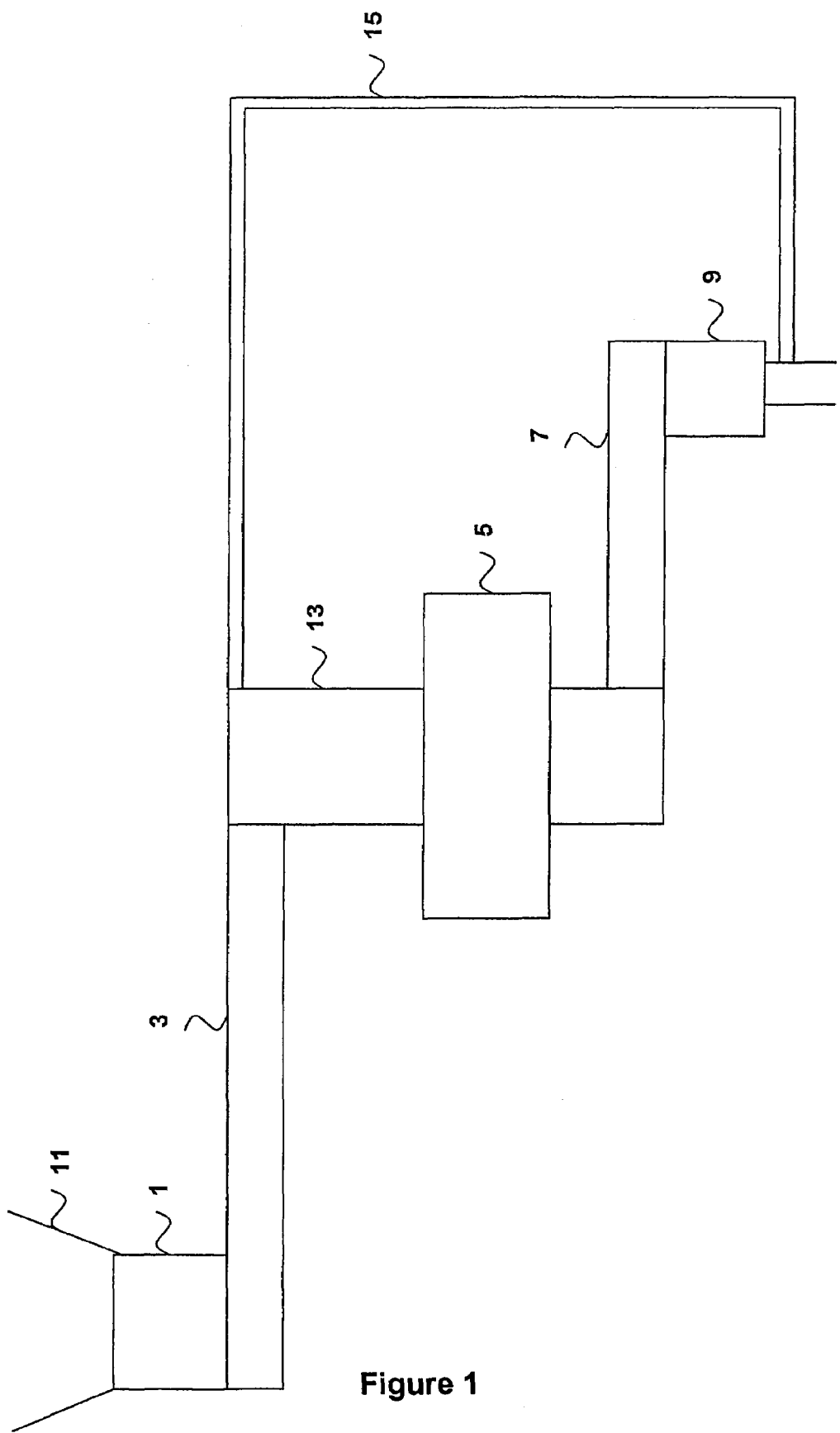

The present invention relates to a method for the improved extraction and subsequent isolation of constituents from sugar beets (*Beta vulgaris*), or sugar beet chips respectively.

Valuable constituents are obtained, as is known, from a plurality of varied biological materials, specifically raw plant materials such as agriculturally obtained fruits, using mechanical and/or thermal methods. In order to be able to separate out these constituents from the biological material, the membranes of the cellular material, specifically of the plant cell, must be disrupted in each case. This normally happens from the effects of mechanical forces such as chopping, grating, rolling, etc. Other methods for disrupting the cell membranes of the biological material are thermal cell disruption in which the cell membranes are denatured by the effects of temperature or the combination of thermal and mechanical methods. Following the disruption process, the soluble constituents of the biological material are pressed out using solvents, usually water, extracted or, in the case of non-soluble materials, flushed out.

Such methods for extracting constituents from biological material are particularly relevant for the sugar industry since, as is known, in order to obtain sugar (sucrose) in Central Europe sugar beets (*Beta vulgaris*) have to be processed in such methods in order to extract the sugar. Traditionally, the washed sugar beets are cut into chips, also called cossettes, in conventional slicing machines and the chips thus obtained are scalded in a chip scalder with hot water at approximately 70 to 75° C. The sugar beet cells are thermally denatured, that is to say the cell walls are disrupted and thereby permeable to sucrose molecules. In a subsequent extraction process, usually by means of counter-current extraction, a sucrose-bearing extract (raw juice) is obtained at temperatures of approximately 68 to 70° C.

In order to allow efficient extraction, as is known, a substantial quantity of extraneous water (condensate) must be added. To optimize the extraction process and to minimize the residual content of sugar in the extracted chips, usually approximately 105% to 110% raw juice with respect to the volume of chips is drawn off in the known methods. The extract is calculated from the ratio of the volume of extract to the volume of sugar beet used. Subsequently, juice purification of the extract can be carried out.

In addition to the substantial quantity of extraneous water required for the extraction, the processing of biological material for the isolation of the constituents is an intensely energy-intensive procedure. In particular, the thermal disruption of the biological material at normal temperatures of above 70° C. requires high energy input. But a substantial quantity of extraneous water must also be heated to temperatures above 70° C. for the subsequent extraction step and evaporated in the further course of the process at great expense. Therefore, the need exists from the prior art to disrupt biological material, specifically sugar beets or sugar beet cells, with low energy consumption and to reduce the quantity of water and energy used for obtaining the constituents from the biological material by applying a suitable method downstream.

The technical problem of the present invention is to prepare an improved method for extracting and subsequently isolating constituents from biological material, namely sugar beet chips, and a device to carry out the improved method, wherein the improved method is distinguished in particular by great efficiency and economy with simultaneous low consumption of resources such as energy and water.

The present invention solves the basic technical problems by a method for extracting and, as an option, subsequently isolating constituents from sugar beets comprising the steps:
(a) comminution of the sugar beets into sugar beet chips in a device for comminuting sugar beets into sugar beet chips while obtaining a chip-juice mixture, then
(b) addition of raw juice or water to the chip-juice mixture obtained in order to obtain a processed chip-juice mixture with a conductivity of 2.6 mS/cm to 10 mS/cm and
(c) adjusting sugar beet chip bulk density to between 400 kg/m$^3$ and 800 kg/m$^3$ in the processed chip-juice mixture in a electroporation device, followed by
(d) electroporation of the chip-juice mixture obtained in step (c) and then
(e) extraction of the chip-juice mixture obtained in an extractor.

and, as an option, the extraction or isolation of constituents from the extract of the electroporated chip-juice mixture. The technical problem of the present invention is also solved by an installation for the extraction and isolation of constituents from sugar beet chips, comprising at least one device for comminuting sugar beets into sugar beet chips, at least one adjoining device for transporting the chip-juice mixture obtained, at least one adjoining device for transporting the chip-juice mixture obtained, at least one adjoining device for the electroporation of the chip-juice mixture, at least one adjoining one device for transferring the electroporated chip-juice mixture and at least one adjoining device for extracting the chip-juice mixture.

The procedure in accordance with the invention, in which a medium of comparatively high conductivity is used for electroporation, is surprising to the extent that it has usually been generally assumed that the prerequisite for creating a strong electrical field necessary for electroporation is low conductivity in the chip-juice suspension solution. Since high conductivity in the electroporation of chips occurs in a short time because of mass transfer, for example sugars and salts, from the chip into the suspension, it had to be assumed that quite large quantities of fresh water have to be fed into the reactor in order to counteract this rise in conductivity. In accordance with the invention, it was possible to show that electroporation of chips, particularly when a high bulk density for the chips is set, is superior to the electroporation of sugar beets. In addition, electroporation of chips in contrast to the electroporation of the considerably larger, more compact and more temperature-inert sugar beets allows the material to be electroporated, that is the chips, to be heated before electroporation. The sugar beets on the other hand, which are normally cold at harvest time, cannot be heated up with an acceptable level of energy expenditure. The procedure in accordance with the invention of electroporating the chips in the way cited therefore makes it possible to pre-heat the electroporation material, for example to temperatures of 5 to 40° C., preferably 10 to 40° C., so that subsequently, because of the higher temperatures of the electroporation material, electroporation can be performed more efficiently, or rather electroporation at lower field strengths. The heating of the electroporation material mentioned is possible in accordance with the invention only with chips, not on the other hand with sugar beets, and results in a corresponding reduction of field strengths. The invention therefore provides a particularly efficient and economical method.

The invention envisages that sugar beets are reduced to sugar beet chips in a first procedural step. Sugar beet chips in the context of the present invention are sugar beets that have been subdivided, or rather cut into slices. The invention envisages that sugar beets are processed into sugar beet chips, for example in a slicer, wherein a chip-juice mixture is formed which comprises the chopped up sugar beets and the issuing cell juice.

A medium, for example water, preferably raw juice, specifically alkalized raw juice from an alkalized sugar beet extraction, specifically alkaline sugar beet chip extraction, is added to the chip-juice mixture. A processed chip-juice mixture (designated as containing a medium) is obtained, which has a conductivity of 2.8 mS/cm to 10.0 mS/cm. A bulk density of sugar beet chips of 400 kg/m$^3$ to 800 kg/m$^3$ is adjusted simultaneously or immediately thereafter in this medium-containing chip-juice mixture, which is preferably in an electroporation device. In accordance with the invention, preferably no or only very minor air inclusions are present in the sugar beet chip-juice mixture processed at the bulk density adjusted for the beet chips. The bulk density used in accordance with the invention can preferably be effected by pre-pressure built up by chip material accumulated in a drop chute. The use of the medium-containing chip-juice mixture, while adhering to the aforementioned chip bulk density, allows subsequent electroporation to be carried out free of air inclusions and in an energy efficient manner way. The electroporated chip-juice mixture, that is to say the chip-juice mixture exposed to electroporation, is subsequently passed on to an extractor for extraction and then constituents such as sugar can be obtained in normal process steps, for example by way of evaporation and/or cooling crystallization.

In a further preferred embodiment, the invention relates to an previously named process wherein the addition of the medium and the calibration of the conductivity in step (b) can also happen in step (c), so steps (b) and (c) coincide. In the same way, step (c) can be carried out chronologically before step (b). In an especially preferred embodiment, it is foreseen that the conductivity in step (b) and/or (c) is adjusted to between 2.6 mS/cm and 6.0 mS/cm.

In a further preferred embodiment, it is foreseen that the bulk density adjusted in step (c) is set to 450 kg/m$^3$ to 700 kg/m$^3$.

In a preferred embodiment, it is foreseen that the chips or the chip-juice mixture or the processed chip-juice mixture is heated to a higher temperature before electroporation, compared with the harvested sugar beets, specifically 5 to 40° C., preferably 10 to 40° C., in particular preferably 15 to 35° C.

As a result of the electroporation of sugar beet chips carried out in accordance with the invention, the cells of the biological material, the sugar beet chips, are opened using high-voltage impulses. For this reason, thermal opening of these cells is not necessary for downstream extraction.

In the context of the present invention "biological material" is understood to mean sugar beet chips (*Beta vulgaris*).

In the context of the present invention, extraction is understood to mean a separation method for dissolving out specific components, specifically constituents, from solid or fluid substance mixes, specifically biological material, with the assistance of suitable solvents, wherein no chemical reactions take place between the solvent and the solute material, that is to say the constituent of the biological material. In obtaining water-soluble constituents such as sucrose, inulin, starch from biological material, water is preferably used as the means of extraction, for example in obtaining sugar from sugar beet chips. In a variant, fat-soluble constituents can be additionally or exclusively obtained from the biological material by the use of primarily non-polar and/or organic solvents.

In accordance with the present invention, step (d) of the method from the invention, that is the electroporation of the biological material, is performed in a conductive medium, that is in a chip-juice mixture—or suspension—formed during the comminution of the beets in step (a), if necessary with the addition of water or raw juice, but preferably with the addition of alkalized raw juice, wherein the biological material is exposed to a high-voltage field. The high-voltage field is preferably produced in an intrinsically known way, for example through voltage-carrying electrodes by applying a voltage, specifically a high voltage, across the biological material. Preference is given to using pulse-shaped high-voltage curves, but periodic alternating fields and direct-current voltage fields are also envisaged. The field strength is preferably 0.1 to 20 kV/cm, preferably approximately 1 to 5 kV/cm, in particular 2 to 4 KV/cm. In a particularly preferred variant, the conductivity of the medium in which the biological material is located is adjusted to the conductivity of the biological medium such that an optimal field line curve is achieved within the biological material, with the conductivity preferably being approximately 2.6 to 10.0 mS/cm, specifically 2.6 to 6.0 mS/cm.

Without being limited to the theory, since the cells have already been opened by electroporation, the demands on the subsequent extraction are significantly reduced so that extraction of the biological material can take place at significantly low temperatures compared with customary methods. The method preferred in accordance with the invention is thus distinguished by the fact that extraction step (e) is carried out at a considerably reduced temperature compared with the prior art, that is at a temperature of 0 to 65° C., in particular 10 to 65° C., preferably from 45 to 60° C., specifically 46 to 60° C. Naturally, the extraction temperature can be adjusted to the requirements of the biological material and be considerably lower or higher as long as extraction can still be carried out. Because of the reduction in extraction temperature, the biological material, that is to say the sugar beet chips, is treated more gently than with the traditional method or thermal denaturing. Under the invention, there is an advantageous increase in the ability of the biological material, the sugar beet chips for example, to be pressed of approximately 2% points in the % DM (dry matter content).

In accordance with the invention, it is also foreseen in one embodiment that the purified extract, specifically the thin juice I and II, is subsequently thickened in a multi-stage vaporization plant to approximately 70% dry matter content.

Under the invention, preference is given to isolating the sugar from the extract and/or thin juice obtained from the extraction of sugar beet chips treated in accordance with the invention in a multi-stage crystallization plant. The extracted biological material, specifically the extracted beet chips, are subsequently dewatered mechanically and mixed, for example, with molasses and preferably after thermal drying marketed as feed, in particular as feed pellets.

In a preferred variant, the extraction in step (e) takes place as alkaline extraction, in particular using alkalizing agents such as milk of lime and/or quick lime. In this context, "alkaline" is understood as the pH value of an aqueous medium from a pH reading of approximately 7 up to approximately 14 (at 20° C.). In a preferred variant, the alkaline extraction is carried out at a pH of 7.5 to a pH of 11, in particular at a pH of approximately 10, for example 10.2.

With alkaline extraction, chemical reactions with the biological material cannot be excluded in all cases, in particular a quantity of high-molecular weight calcium pectate can be formed. With known extraction temperatures of approximately 70 to 75° C., these undesirable chemical reactions of alkaline extraction are so violent that occasionally large quantities of calcium pectate are formed, which makes the filtration of the extract obtained, purified preferably by juice purification, considerably more difficult so that such a method cannot be transformed into practice. In contrast, the alkaline extraction preferred in accordance with the invention, which is performed at low temperatures, reduces the formation of these high-molecular weight compounds, whereby a filtration coefficient of less than 1 mm/g can be achieved when filtering the purified extract, in particular of the thin juice I and/or thin juice II obtained in the sugar beet extraction by purifying the juice.

The addition of alkalinity into the biological material, that is to the sugar beet chips, for example in the form of milk of lime, calcium hydroxide, calcium or quick lime, preferably takes place immediately after electroporation (step (d)), for example in an interim hopper before further processing of the biological material. In a further variant, the alkalinity is introduced immediately before extraction is carried out (step (e)).

In a preferred embodiment of the invention, the alkalization of the biological material, the sugar beet chips, is performed by adding the alkalizing agents directly into the slicer, that is to say the device for chopping up the beets, in step (a), and/or subsequently in step (b) and/or in step (c). This has the advantage of partially disinfecting the biological material.

In accordance with the invention, the alkalinity is preferably introduced into the biological material in the form of aqueous solutions, preferably sprayed on. In a further variant, at least one alkaline material, in particular lime such as quicklime, is introduced into the process as a solid, preferably in powder form for the purpose of bringing alkalinity to the biological material.

Through the introduction of alkalinity into the biological material, the risk of infection of the biological material is reduced and the microbiological stability of the biological material and the separated cell juice during processing is increased. The microbiological stability is approximately $10^4$ CFU/ml.

In a further preferred variant, at least one excipient is added to the biological material in the process in accordance with the invention, for example in step (a), (b), (c), (d) and/or (e). In the context of the present invention, an "excipient" is understood to be a compound or chemically pure substance which has no function in the constituent obtained, preferably the foodstuff obtained. They are operating materials such as condensate, but also process water, solvents, disinfectants such as formaldehyde or anti-foaming agents. Preferably they are also flocculation aids such as cationic or anionic flocculation aids, substances for the introduction of alkalinity and/or calcium ions such as milk of lime, quicklime, calcium hydroxide, calcium saccharate, calcium sulfate and other calcium salts and/or aluminum salts. The at least one excipient preferably added in accordance with the invention is normally introduced into the biological material in the form of a solution, preferably sprayed on. In a further variant, the at least one excipient is introduced as a solid, preferably in powder form.

It is particularly advantageous for the cell walls of the beet cells to be opened by the electroporation of the biological material in step (d) in accordance with the invention, which makes the introduction of alkalinity and/or calcium ions into the biological material easier. In particular, through the preferred combination in accordance with the invention of electroporation in step (d) and the specifically alkaline extraction in step (e), there is a further increase in the ability of the biological material to be dewatered, for example by pressing, of up to approximately 8% points dry matter content when the process according to the invention is completed.

The preferred subject of the present invention is thus also a method for increasing the ability of extracted biological material to be pressed, in particular sugar beet chips, and consequently of the amount of dry matter that can be achieved in the pressing. The process is characterized that electroporation of the biological material, specifically of sugar beet chips, is carried out in a first step in accordance with the process steps (b), (c) and (d) previously performed, and in a further step an alkaline extraction of the electroporated biological material, specifically electroporated sugar beet chips, is carried out and subsequently extracted biological material is obtained with an increased ability to be pressed.

A further preferred subject of the present invention is therefore a method for obtaining extracted biological material, in particular extracted sugar beet chips, with a high proportion of dry matter, preferably of approximately 38% dry matter content, comprising the steps (a) comminuting the sugar beets into beet chips in a device for comminuting beets into beet chips, obtaining a chip-juice mixture, then (b) adding raw juice or water to the chip-juice mixture obtained to obtain a prepared chip-juice mixture with a conductivity of from 2.6 mS/cm to 10 mS/cm and simultaneously or subsequently (c) adjusting a beet chip bulk density to between 400 kg/m$^3$ and 800 kg/m$^3$ in the processed chip-juice mixture in an electroporation device, then (d) electroporation of the prepared chip-juice mixture obtained in step (c) and then (e) extraction of the electroporated chip-juice mixture obtained in an extractor, wherein in a following step the electroporated biological material, specifically electroporated sugar beet chips, is pressed in a known way and then extracted biological material with increased dry matter content is obtained.

Subject of the present invention is therefore also an installation to extract and obtain constituents from biological material which is used to perform the process in accordance with the invention. Under the invention, this installation to extract and obtain constituents from sugar beet chips has at least one device to reduce beets to beet chips, at least one adjoining device to transport the chip-juice mixture obtained, at least one adjoining device for electroporation of the chip-juice mixture, at least one adjoining device to pass on the electroporated chip-juice mixture and at least one adjoining device to extract the chip-juice mixture. The invention relates in a further preferred embodiment to a previously mentioned installation, wherein this installation also has a device to feed in raw juice, in particularly alkalized raw juice. In a particularly preferred embodiment, this device for feeding in raw juice is configured as a pipe between the extractor, that is, the device for extracting the chip-juice mixture, and the electroporation device. Provision can also be made for the device for feeding in raw juice, in particular alkalized raw juice, to be executed as a pipe between the extractor and the device for chopping up the sugar beets or the adjoining transport device for the chip-juice mixture obtained.

The installation for extracting and subsequently obtaining constituents from beet chips is characterized by particularly low construction costs compared with a reactor for electroporating beets. The construction costs for the electroporation of beets are substantial since the existing beet hopper must be raised, the electroporation reactor has to be installed between beet hopper and slicer, and separate pre-storage hoppers must be constructed for each slicer and the electroporated and cut chips must be transported by screws to the scalder (device for extraction). In contrast, it is foreseen under the invention that electroporation of chips takes place by integrating the electroporation reactor between the chip conveyor and the chip scalder. In a particularly preferred embodiment of the present invention, installation of the electroporation reactor is envisaged in the customary drop chute from the chip conveyor to the scalder.

In a preferred embodiment, the device in accordance with the invention for comminuting the beets into beet chips is a slicer, that is to say a cutting machine, preferably a drum cutting machine which is located on the transportation path of the beets. In a variant, the slicer is provided with an interim hopper to receive the beets which provides the necessary initial pressure for the biological material to be cut up, primarily by stacking it up.

In accordance with the invention, the extractor is preferably an extraction tower. In a variation, the extractor is a trough screw extractor such as a DDS extractor. In a further variant, the extractor is a drum cell extractor, such as an RT drum.

In a preferred embodiment of the device according to the invention, at least one metering device is envisaged in addition for introducing excipients and/or alkalinity. This metering device contains at least one irrigating line with at least one nozzle head attached thereto for spraying excipient solutions and/or alkalizing agents such as milk of lime onto the biological material. In a further variant, the at least one metering device is a device which serves to introduce solid materials, preferably powdered media, in particular it is a pneumatic meter and/or a spiral conveyor.

The metering device is preferably located in a metering region of the transportation device for the chip-juice mixture. In one variant, the metering device is located in a metering region of the intermediate hopper. In a further variant, the metering device is located in metering region of the scalder, that is ahead of or on the extractor. In this context, "metering region" is understood to mean that circumscribed area from which the metered materials, that is the aforementioned excipients, alkalizing agents, etc., can be introduced into or onto the biological material by means of the chosen metering device.

Additional advantageous embodiments emerge from the dependent claims.

The device according to the invention is explained in more detail by the figure: the figure shows a schematic representation of a preferred embodiment of the device according to the invention.

The invention is explained in more detail with reference to the following example:

EXAMPLE

Alkaline Extraction of Electroporated Beet Material

From an intermediate hopper for beets (11), beets are transferred to a device for comminuting beets into beet chips (1). The chip-juice mixture formed during comminution is taken by a device for transporting the chip-juice mixture (3) (chip conveyor) to a drop chute (13) into which an electroporation device (5) is integrated. The electroporated chip-juice mixture leaves the electroporation device (5) and reaches a device for extracting the chip-juice mixture (9) by way of a device for transferring the electroporated chip-juice mixture (7). From the outlet of this device (9), a pipe (15) for feeding alkalized raw juice obtained from the extraction device (9) leads into the electroporation device (5) or into the drop chute (13) into which the electroporation device is integrated.

The method according to the invention operates as follows:

Directly harvested or stored sugar beets are washed, heated to approximately 12° C. as necessary and then, possibly in a coarsely chopped form, conveyed to an intermediate hopper (11) directly above the cutting machine (1), pass from there into the slicer (1), are comminuted into chips and then move by way of a transfer chute into a device for transporting the chip-juice mixture obtained (3). In order to reduce microbiological activity, milk of lime is metered into the intermediate hopper.

The device for transporting the chip-juice mixture obtained (3), also designated as a chip conveyor, conveys this mixture to the drop chute (13) in which the electroporation device (5) is integrated. A chip-juice mixture free of air inclusions and containing a medium having a conductivity of 5 mS/cm is prepared in the electroporation device by the metered addition of alkalized raw juice from the pipe (15) which opens into the drop chute (13) and brings alkalized raw juice from the extraction device (9). The height of the drop chute (13) is designed such that a bulk density of 520 kg/m$^3$ is achieved in the electroporation reactor (5), where there are no longer any air inclusions or bubbles in the compressed chip-juice mixture. High-voltage pulses of 3 to 4 kV/cm are used in the electroporation device, wherein the cells wall are opened in a way known per se.

The beet chips and juice transported by means of the transfer device (7), if necessary by way of a chip scalder not shown separately, are then taken to a counter-current extraction installation (9), extracted therein and the extract is collected. The extraction temperature is between 46 and 60° C.; a temperature clearly above 46° C. is preferably chosen, but a maximum of at most 60° C. The extractor is an extraction tower, a trough-screw extractor or a drum cell extractor. The chips are extracted in the extractor in countercurrent to the extraction agent, meaning fresh water.

Following this, a milk of lime-carbonic acid purification of the juice is carried out, which is not shown. The purified extract (thin juice 1 and II) undergoes conventional further processing; that is to say after the thickening of the juice into a syrup, the sugar is obtained by addition vaporization and successive crystallization in crystallizers. The calcium carbonate sludge which has separated off is dewatered conventionally in filter presses, not shown, and marketed as fertilizer, known as carbolic lime.

A flocculation aid is added to the cell juice obtained after it has first been alkalized. The transport juice is then taken to a conventional static decanter. The fines are drawn off from the decanter and taken to the pre-liming installation for the processing of extract which is performed in parallel. The clear run-off from the decanter is taken to be utilized further, which comprises combining it with thin juice from the processing of the extract. Parallel to this, the resulting extract is subjected to conventional juice purification.

The extracted chips are pressed in screw presses, not shown. The press water pressed out is returned to the extractor. The pressed chips are dewatered thermally in a conventional manner, that is to way in low-temperature dryers, high-temperature dryers or evaporation dryers.

What is claimed is:

1. A method for extracting constituents from sugar beets, the method comprising:
   (a) comminution of the sugar beets into beet chips in a device for comminuting beets into beet chips while obtaining a chip-juice mixture;

(b) addition of raw juice or water to the chip-juice mixture obtained in order to obtain a prepared chip-juice mixture with a conductivity of 2.6 mS/cm to 10.0 mS/cm;

(c) adjustment of a sugar beet bulk density of 400 kg/m$^3$ to 800 kg/m$^3$ in the prepared chip-juice mixture in an electroporation device;

(d) electroporation of the prepared chip-juice mixture obtained in step (c); and (e) extraction in an extractor of the electroporated chip-juice mixture obtained.

2. The method of claim 1, wherein the conductivity in step (b) is adjusted to 2.6 mS/cm to 6.0 mS/cm.

3. The method of claim 1, wherein the bulk density in step (c) is adjusted to 450 kg/m$^3$ to 700 kg/m$^3$.

4. The method of claim 1, wherein in step (b) and/or following step (d) excipients are added to the chip-juice mixture.

5. The method of claim 1, wherein step (e) is carried out at a temperature of 0° C. to 65° C.

6. The method of claim 1, wherein step (e) is an alkaline extraction.

7. The method of claim 1, wherein the raw juice added in step (b) is an alkalized raw juice.

8. The method claim 1, wherein the processed chip-juice mixture is adjusted before electroporation to a temperature of 5° C. to 40° C.

9. The method of claim 4, wherein the excipients are lime and/or milk of lime.

10. The method of claim 1, wherein step (e) is carried out at a temperature of 45° C. to 65° C.

11. The method of claim 1, wherein the processed chip-juice mixture is adjusted before step (d) to a temperature of 10° C. to 40°.

12. An installation for extracting and isolating constituents from beet chips the installation comprising:
at least one comminuting device for comminuting beets into beet chips while obtaining a chip-juice mixture;
at least one electroporating device for the electroporation of the chip-juice mixture;
at least a first transfer device disposed between the at least one comminuting device and the at least one electroporation device for transferring the chip-juice mixture from the at least one comminuting device to the at least one electroporation device;
at least one extracting device to extract the electroporated chip-juice mixture;
at least a second transfer device disposed between the at least one electroporation device and the at least one extraction device for transferring the electroporated chip-juice mixture from the at least one electroporation device to the at least one extraction device; and
a feeding device in communication with the electroporation device or upstream of the electroporating for feeding in raw juice from the extracting device either into the electroporating device or upstream of the electroporating device.

13. The installation of claim 12, further comprising at least one metering device to meter excipients.

14. The installation of claim 12, wherein the electroporating device is executed as a shaft reactor.

15. The installation of claim 12, wherein the feeding device allows for feeding in alkalized raw juice.

16. The installation of claim 12, wherein the feeding device receives the raw juice from the at least one extraction device.

17. A method of extracting constituents from sugar beets, the method comprising:
(a) comminution of the sugar beets into beet chips to obtain a chip-juice mixture;
(b) addition of raw juice or water to the chip-juice mixture to obtain a prepared chip-juice mixture;
(c) electroporation of the prepared chip-juice mixture with an electroporation device; and
(d) extraction of the electroporated chip-juice mixture with an extraction device
wherein step (b) includes adding raw juice or water from the extraction device to the chip-juice mixture in the electroporation device or upstream thereof.

18. The method of claim 17, further comprising adjustment of a sugar beet bulk density of the prepared chip-juice mixture in the electroporation device to 400 kg/m$^3$ to 800 kg/m$^3$.

19. The method of claim 18, wherein step (b) obtains a prepared chip-juice mixture with a conductivity of 2.6 mS/cm to 10.0 mS/cm.

20. The method of claim 17, wherein step (b) includes adding alkalized raw juice from the extraction device to the chip-juice mixture in the electroporation device or upstream thereof.

* * * * *